(12) United States Patent
Beldock

(10) Patent No.: US 6,490,565 B1
(45) Date of Patent: Dec. 3, 2002

(54) ENVIRONMENTAL CERTIFICATION SYSTEM AND METHOD

(75) Inventor: John A. Beldock, Evergreen, CO (US)

(73) Assignee: Environmental Plus, Inc., Evergreen, CO (US)

( * ) Notice: Subject to any disclaimer, the term of this patent is extended or adjusted under 35 U.S.C. 154(b) by 0 days.

(21) Appl. No.: 09/168,266

(22) Filed: Oct. 8, 1998

(51) Int. Cl.⁷ .......................... G06F 17/60; G06F 159/00
(52) U.S. Cl. .................. 705/1; 705/7; 705/8; 705/9; 705/10; 705/14; 705/26; 705/27; 705/28; 707/1; 707/6; 707/100; 707/200
(58) Field of Search ................................ 705/7, 10, 14, 705/1, 26, 27, 28, 29, 8, 9; 707/1, 6, 100, 200

(56) References Cited

U.S. PATENT DOCUMENTS 5,664,112 A * 9/1997 Sturgeon et al. .............. 705/28
5,726,884 A * 3/1998 Sturgeon et al. ............... 705/9
5,893,070 A * 4/1999 Garber et al. .................. 705/1

FOREIGN PATENT DOCUMENTS

JP 7105139 * 4/1995

OTHER PUBLICATIONS

Vlosky et al., "Chain of custody vital to certification process", Wood Technology, v122n2, pp.:35–36, Mar./Apr. 1995.*
Dudley, "A Framework for environmental labeling", Environment, v. 39, p. 16–20, Jul./Aug. 1997.*
Adolphe, "Portable data collection system for safety and quality assurance", Construction Congress Proceedings, ASCE, New York, USA. p 414–421, 1997.*
"Bellcore: unveils new certification mark; Bellcore certification available to equipment manufactures", EDGE, on & about AT&T, v11, n6, p19 (1), erb 5, 1996.*
"Three General Electric Engergy–Efficient Light Bulbs Earn the Green Seal of Approval", PR Newswire, p0917DC100, Sep. 17, 1993.*
"Environment Friendly Labelling", Food Cosmetics & Drug Packaging, v12, n4, pN/A, Jul., 1989.*

* cited by examiner

Primary Examiner—Vincent Millin
Assistant Examiner—Nga B. Nguyen
(74) Attorney, Agent, or Firm—David P. Gordon; David S. Jacobosn; Thomas A. Gallagher (57) ABSTRACT

A data processing method for an environmental certification program is provided which defines a plurality of predefined criteria which must be met by a participant in the program in order to be provided with a privilege of providing a certification mark for use on goods and in advertising materials of the participant. The data processing method tracks the compliance by the participant with the environmental certification program, and further evaluates the continued certification of a participant in the program. Preferably, continued certification requires achieving additional predefined criteria while maintaining the predefined criteria which led to initial certification. Moreover, compliance with the predefined criteria is preferably ensured with periodic on-site verification. The predefined criteria preferably are distinguished across several categories and including energy efficiency, the use of renewable energy, recycling, waste minimization, health and safety, reduction of environmental liabilities, corporate citizenship. The criteria for all participants in the program are uniform. As such, the use of the certification mark by a complying participant has discernable value in the marketplace, and the continued display of the certification mark by a participant on its goods and advertising signifies the participant's dedication and actions with respect to environmental concerns.

24 Claims, 6 Drawing Sheets

| CATEGORY | PEMs | EXAMPLES |
|---|---|---|
| ENERGY EFFICIENCY | USE OF ENERGY EFFICIENT LIGHTING TECHNOLOGY | FLUORESCENT LAMPS; BALLASTS, OR LUMINARIES; HID LIGHTING; TASK LIGHTING; LIGHTING CONTROL SYSTEMS; NATURAL LIGHTING |
| | ENERGY EFFICIENT COMMERCIAL APPLIANCES | ICE CUBE MACHINES; OFFICE WATER COOLERS; COMMERCIAL REFRIGERATION; VENDING MACHINES; REFRIGERATED DISPLAYS |
| | ENERGY EFFICIENT HEATING AND AIR CONDITIONING | |
| | ENERGY EFFICIENT WATER HEATING | |
| | SETBACK THERMOSTATS | |
| | ENERGY EFFICIENT COMMERCIAL/INDUSTRIAL TECHNOLOGIES AND MECHANICAL SYSTEMS | MOTOR; MOTOR SYSTEMS; AIR COMPRESSOR SYSTEMS; TRANSFORMERS |
| | ENERGY EFFICIENT COMMERCIAL EQUIPMENT | BOILERS; CENTRAL AIR CONDITIONERS; ELECTRIC CHILLERS; ENERGY MANAGEMENT SYSTEMS; SPACE HEATERS |
| | ENERGY EFFICIENT WINDOWS | |
| | INSULATION | |
| | ENERGY EFFICIENT DOORS | |
| | ENERGY EFFICIENT OFFICE EQUIPMENT | COMPUTERS; MONITORS; PRINTERS; PHOTOCOPIERS; FAX MACHINES |

FIG.1a

| CATEGORY | PEMs | EXAMPLES |
|---|---|---|
| USE OF RENEWABLE ENERGY | WHITENING ROOFS | |
| | USE OF SHADE TREES AND AWNINGS | |
| | USE OF SOUTH SIDE GREENHOUSES AND ATRIUMS | |
| | SOLAR WATER HEATING | |
| | USE OF RENEWABLE TECHNOLOGIES | HEAT PUMPS – GROUND SOURCE; DAYLIGHT SYSTEMS; SOLAR ASSISTED WATER HEATERS; WIND GENERATED POWER SYSTEMS |
| | TRANSPORTATION TECHNOLOGIES AND ALTERNATIVELY FUELED VEHICLES | LIGHT DUTY VEHICLES; REFRIGERATED TRANSPORT SYSTEMS; LOW ROLLING RESISTANCE TIRES |
| RECYCLING | HEATING COILS | |
| | HEATER CORES | |
| | ALUMINUM CANS | |
| | CATALYTIC CONVERTERS AND MIXED METALS | |
| | OFFICE PAPER AND NEWSPAPER | |
| | CHLOROFLUOROCARBONS | |
| | WASTE OIL | |
| | PAINTS, THINNERS, AND SOLVENT | |
| | GLASS, PLASTICS AND ALUMINUM | |
| | WATER | |
| | TIRES | |
| | BATTERIES | |

FIG.1b

| CATEGORY | PEMs | EXAMPLES |
|---|---|---|
| WASTE MINIMIZATION | WATER CONSERVATION AND WATER SAVING TECHNOLOGIES | INSTALLATION OF LOW WATER USE SPRINKLERS, TOILETS, FAUCETS, etc. |
| | LOW-MOISTURE LANDSCAPING | |
| | EFFICIENT MATERIAL USE (REPAIR OVER REPLACE) | |
| | HAZARDOUS MATERIALS SAFETY | |
| | ENERGY EFFICIENT APPAREL | |
| | EFFICIENT EQUIPMENT USE | |
| | ENVIRONMENTALLY-FRIENDLY CLEANING PRODUCTS | |
| HEALTH AND SAFETY | IMPROVE VENTILATION AND INDOOR AIR QUALITY | |
| | ELIMINATING EMPLOYEE CHEMICAL CONTACT | |
| | ELIMINATING EMPLOYEE LEAD CONTACT | |
| | ELIMINATING EMPLOYEE ASBESTOS CONTACT | |
| | ELIMINATING EMPLOYEE RADON EXPOSURE | |
| | ELIMINATING EMPLOYEE ELECTROMAGNETIC FIELD EXPOSURE | |
| | ELIMINATING CARPET ADHESIVES | |
| | IMPROVE DRINKING WATER | |
| | ELIMINATE BACTERIA | |
| | REDUCE EMPLOYEE SOLVENT CONTACT | |

FIG.1c

| CATEGORY | PEMs | EXAMPLES |
|---|---|---|
| REDUCTION OF ENVIRONMENTAL LIABILITIES | REDUCE SITE AIR POLLUTION | |
| | GAS AND WASTE OIL CONTAINMENT | |
| | CHLOROFLUOROCARBON CONTAINMENT | |
| | SOLVENT CONTAINMENT | |
| | REDUCING WATER CONTAMINATION | |
| | REDUCING SOIL CONTAMINATION | |
| | RADON REMOVAL | |
| | ASBESTOS REMOVAL | |
| | LEAD REMOVAL | |
| CORPORATE CITIZENSHIP | ADOPT-A-HIGHWAY PROGRAMS | |
| | WALKING AND HIKING TRAIL DEVELOPMENT AND MAINTENANCE | |
| | COMMUNITY SERVICE | |

ENVIRONMENTAL CERTIFICATION SYSTEM AND METHOD

BACKGROUND OF THE INVENTION

1. Field of the Invention

This invention relates broadly to data processing methods for an environmental certification program. More particularly, the methods relate to environmental certification methods and systems where participants in the environmental certification program are tracked and evaluated for compliance and certified accordingly.

2. State of the Art

Pollution prevention has become an important issue to industry, business and the public. The public is increasingly desirous of knowledge of which companies have maintained a high standard of environmental performance; i.e., minimizing harmful impact on the environment. Moreover, the public is acting upon this knowledge in the marketplace, specifically seeking out model environmental corporate citizens. As a result, companies are finding that it is to their benefit to invest time and money into improving their environmental performance to thereby enhance their public image and consequently reap the financial rewards of the marketplace. In addition, in many circumstances implementing environmentally sound measures may provide cost savings to a company. Moreover, it has been found that companies which are environmentally responsible provide their employees with a source of pride which translates into improved productivity for employees of those companies.

Companies have vied for environmental awards given by the government, particularly the Environmental Protection Agency, and organizations, for the prestige associated with such awards and perceived economic value of the awards. However, these awards are not based on uniform criteria, and award recipients have varying degrees of environmental performance. Furthermore, these awards are typically provided on a one-time basis and do not confer the level to which the recipient has maintained its environmental responsibility after receiving the reward. In fact, many companies after receiving an award decrease their environmental responsibility, thereby diminishing the perceived value of the award in the marketplace. In addition, such awards do not confer to the recipient the privilege of displaying a policed certification mark in conjunction with the recipient's goods. Therefore, the public is not always aware of the award, and, even if aware, the public often does not confer significant weight to the awards, as the awards are not widely known. Moreover, the criteria for such environmental awards are not tracked in a data processing system which enables the tracking and evaluation of the compliance with such criteria over time.

SUMMARY OF THE INVENTION

It is therefore an object of the invention to provide a data processing method for an environmental certification program.

It is an additional object to provide an environmental certification program.

It is another object of the invention to provide a data processing method which tracks and evaluates the compliance by a participant in the environmental certification program.

It is a further object of the invention to provide a data processing method for an environmental certification program which certifies a participant in the program as being in compliance with the program when the participant complies with predefined criteria.

It is an additional object of the invention to provide a data processing method for an environmental certification program which evaluates the continued certification of a participant in the program when the participant complies with additional predefined criteria.

In accord with these objects, which will be discussed in detail below, a data processing method for an environmental certification program is provided which defines a plurality of predefined criteria which must be met by a participant in the program in order to be provided with a privilege of providing a certification mark to the participant for use on goods, advertising, press materials, etc. The data processing method tracks the compliance by the participant in the environmental certification program, and further evaluates the continued certification of a participant in the program. Preferably, continued certification requires achieving additional predefined criteria in addition to maintaining the predefined criteria which led to initial certification. Moreover, compliance with the predefined criteria is preferably ensured with periodic on-site verification.

The predefined criteria are distinguished across several categories, including energy efficiency, the use of renewable energy, recycling, waste minimization, health and safety, reduction of environmental liabilities, and corporate citizenship. Each category is further refined into a number of "profitable environmental measures" (or PEMs); i.e., particular implementable measures which are environmentally beneficial and preferably profitable to the participant.

According to a preferred aspect of the invention, the participant must implement (and maintain) a predefined number of PEMs prior to being certified, and thereafter implement a predefined number of PEMs at specified years after certification. Preferably, the PEMs are required to be initially implemented at a single facility, and then during a specified period of time after initial implementation, the PEMs are preferably required to be implemented at additional facilities.

The terms of compliance are the same for all participants, and the number of PEMs that must be implemented for any particular participant, as well as the number (or percentage) of the facilities of the participant in which the PEMs must be implemented are tracked in a database of a computer system. In addition, based upon participant reporting and on-site verification, the database also maintains a list of the type of PEMs which the participant has implemented, and provides an evaluation of compliance by the participant and determines whether the participant is eligible for initial and continued certification in the program. If the participant becomes ineligible for certification due to non-compliance with the requirements of the program, the participant loses the privilege of displaying the certification mark in association with the participant's goods and advertising until once again being in compliance with the program.

It will be appreciated that the data processing method for an environmental certification program provides uniform criteria for participants in the program. As such, the certification mark provided by the program to a complying participant has discernable value in the marketplace. In addition, the continued display of the certification mark by a participant on its goods and in its advertising and other materials signifies the participant's dedication to environmental concerns and the willingness of the participant to be a model environmental citizen.

DETAILED DESCRIPTION OF THE PREFERRED EMBODIMENTS

In accord with the invention, a data processing method for an environmental certification program and an associated system is provided. The environmental certification program (hereinafter 'program') is intended for participation by companies (participants) which seek to improve their image and profitability by meeting a standard of environmental responsibility. Participants satisfying the criteria of the program; i.e., "in compliance", are afforded the privilege of a using a certification mark in conjunction with their goods and advertising.

More particularly, the program defines the criteria which must be met by a participant in the program in order to be in compliance. The predefined criteria preferably are distinguished across several categories. The categories preferably include energy efficiency, the use of renewable energy, recycling, waste minimization, health and safety, reduction of environmental liabilities, corporate citizenship. Each category is further refined into a number of "profitable environmental measures" (or PEMs); i.e., particular implementable measures which are environmentally beneficial and preferably profitable to the participant. More particularly, a PEM, where scalably measurable, is preferably a measure whose resource and/or environmental efficiency is in the top twenty percent of the technologies currently available to conduct an associated function or task. Example PEMs for each category are set forth in FIGS. 1a–1d. In addition, a PEM is typically the most cost-effective measure a company can implement for its own bottom line. Therefore, implementation of PEMs is preferably a profitable venture.

With respect to any participant, each of the PEMs set forth in FIGS. 1a–1d can be quantitatively determined before and after implementation. However, for those measures which do not lend themselves to measurement on a quantitative scale of efficiency and environmentally sound operation, approval of such measures as constituting a PEM may be provided at the discretion of the organizers of the program.

Figure 1A:
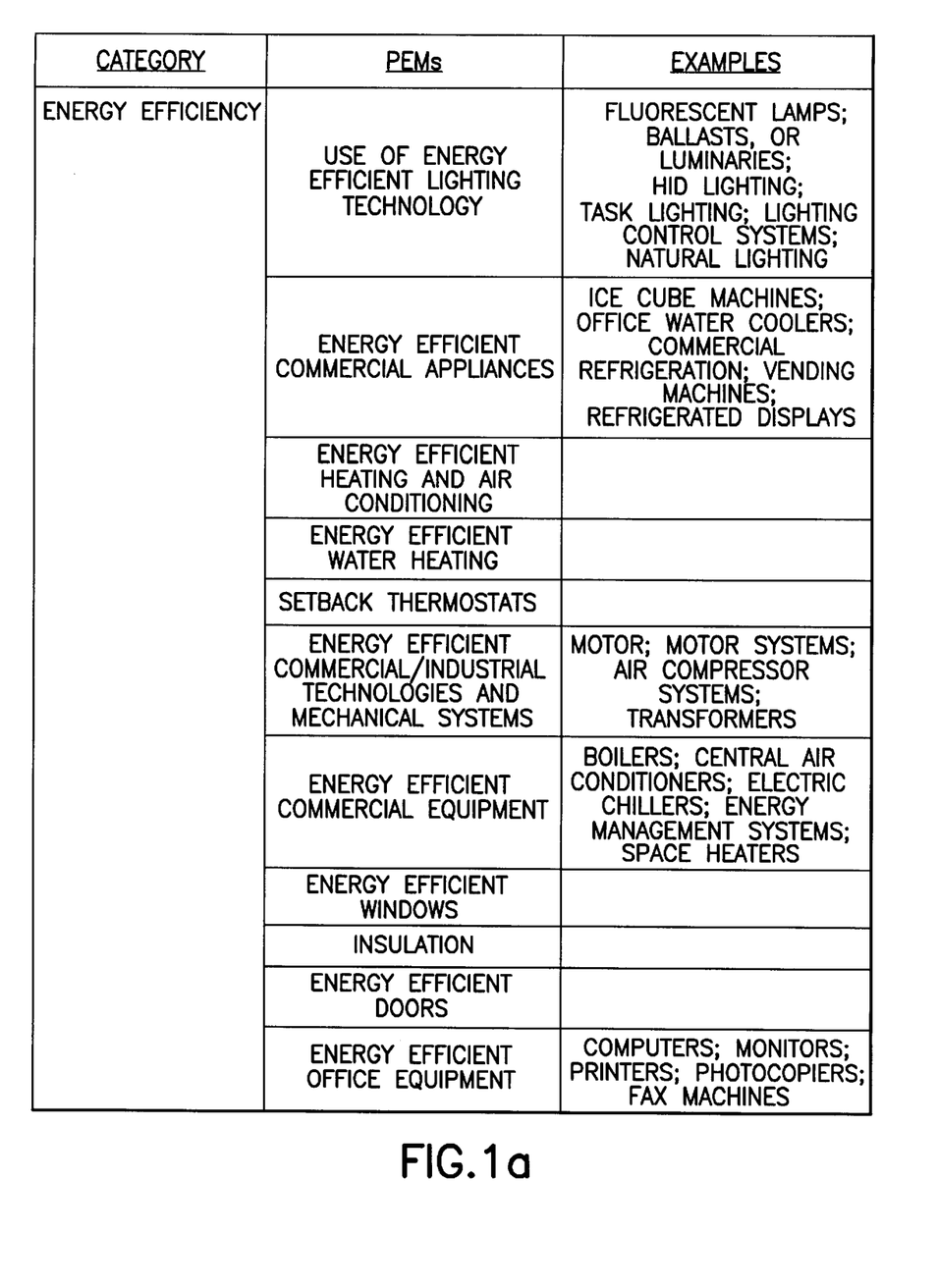
FIGS. 1a through 1d are tables of PEMs separated into categories.
Figure 1B:
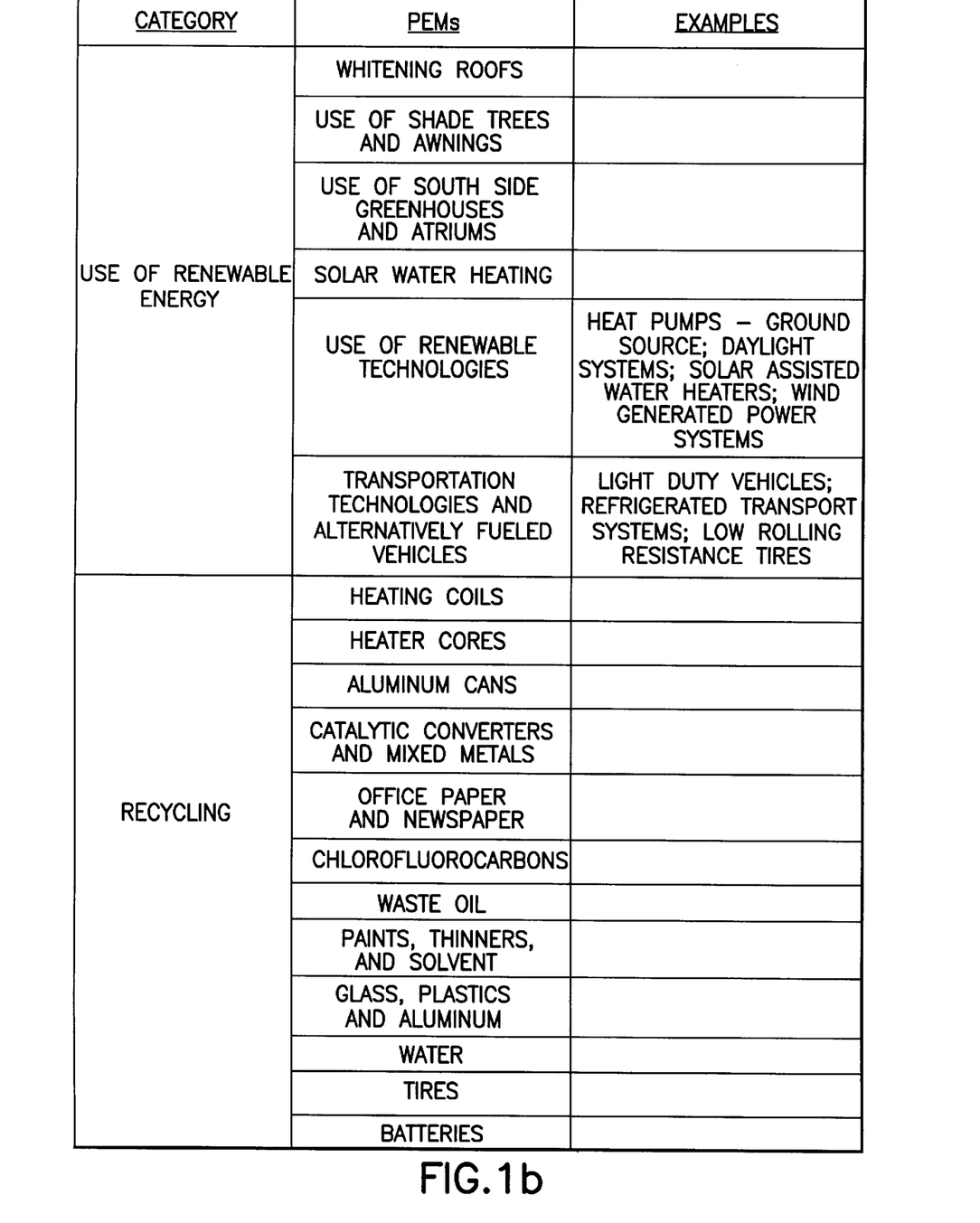
Figure 1C:
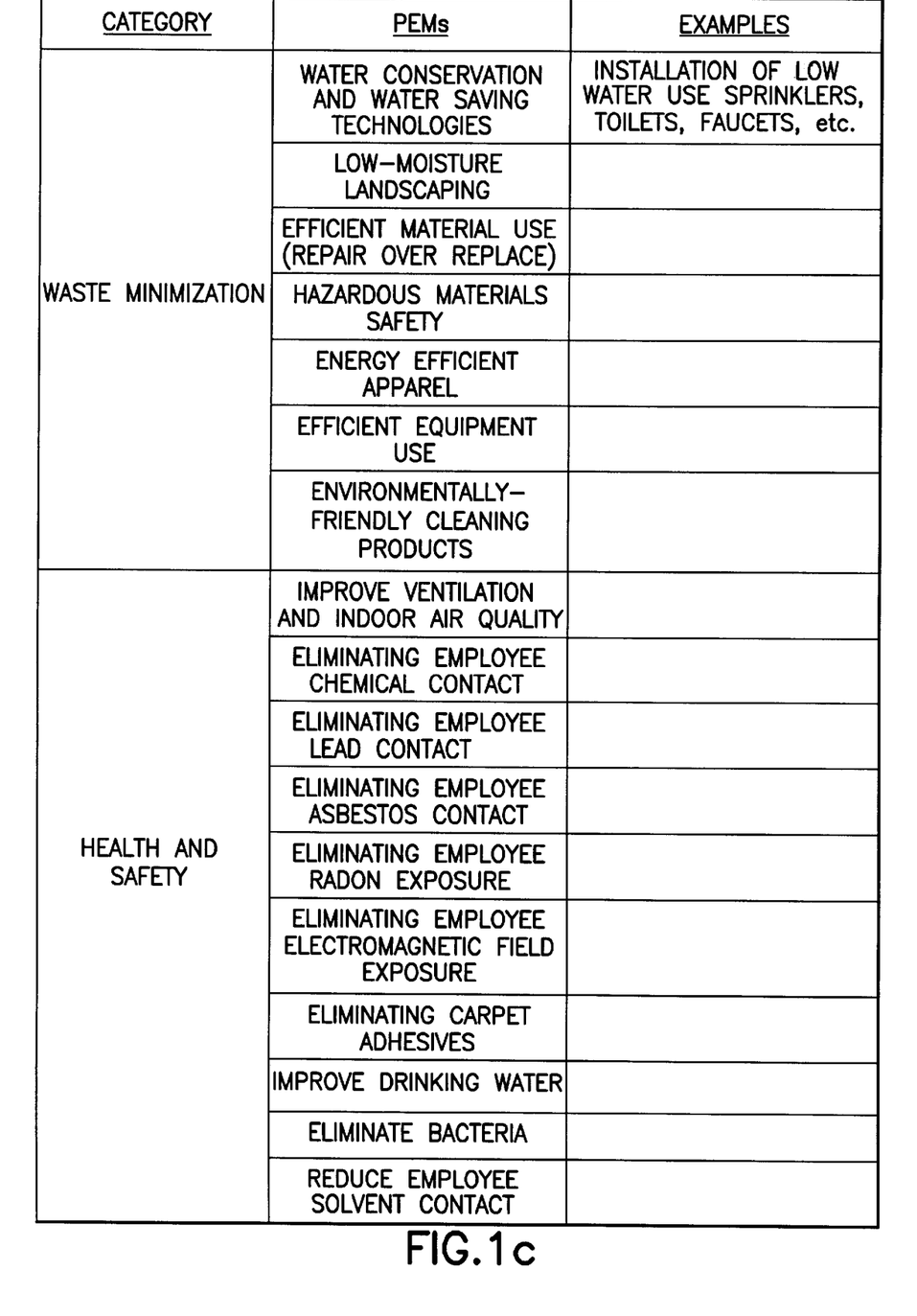
Figure 1D:
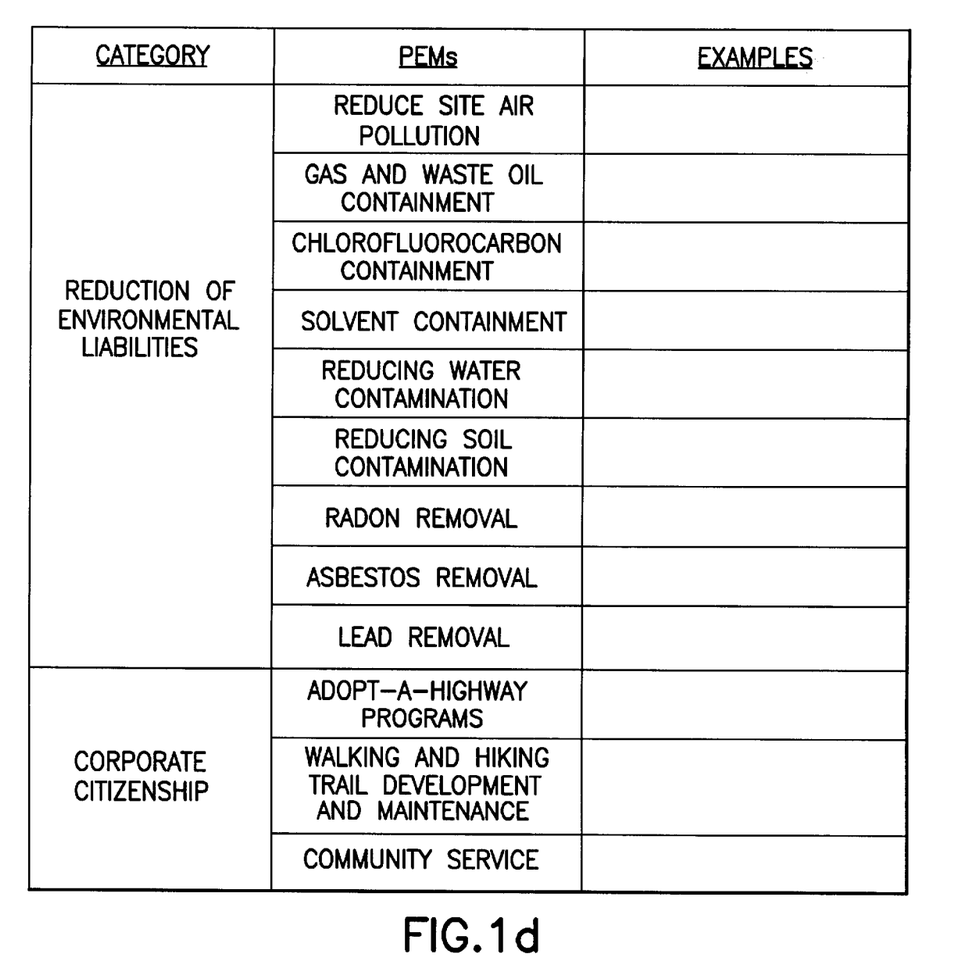
Figure 2:
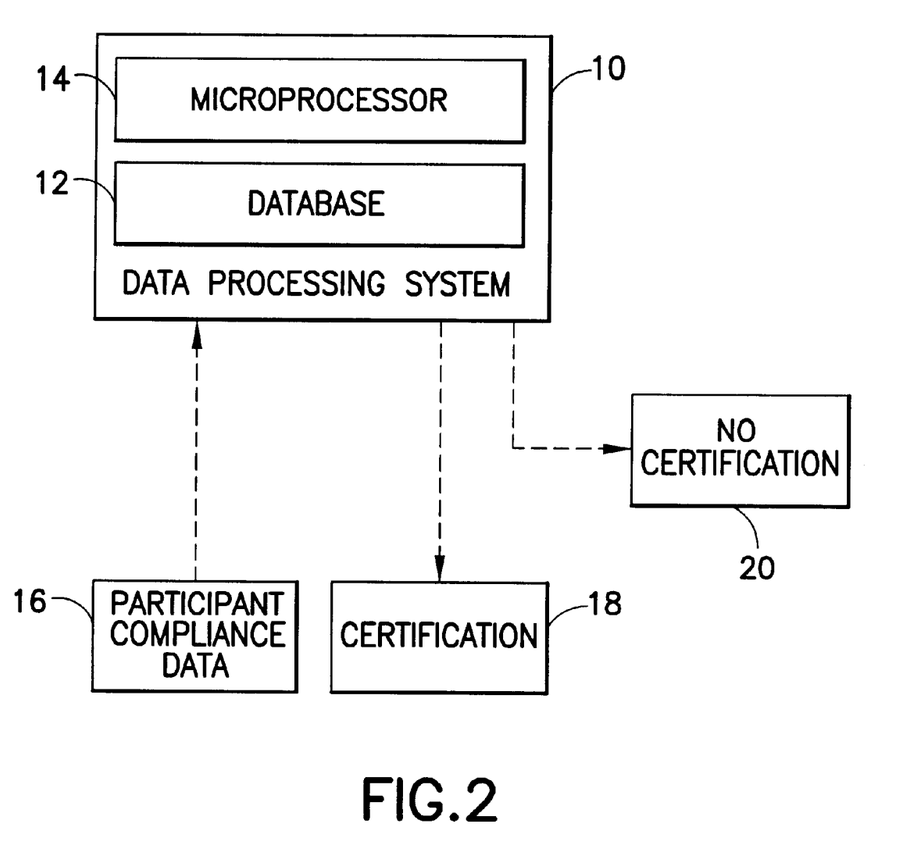
FIG. 2 is a schematic of the database system for the environmental certification program of the invention.

Referring to FIG. 2, a computerized data processing system 10 evaluates and tracks the compliance of a participant in the environmental certification program. The data processing system 10 includes a database 12 and a microprocessor 14 for manipulating the database. Compliance data is entered at 16 into the database 12 and, based upon the compliance data (or lack thereof), the system 10 evaluates the continued certification of a participant in the program; i.e., the system outputs at 18 whether the participant is in compliance and therefore certified or outputs at 20 whether the participant is not in compliance and is therefore not certified. Preferably, continued certification requires achieving, over time, additional predefined criteria in addition to maintaining the predefined criteria which led to initial certification. Moreover, compliance with the predefined criteria is preferably ensured with periodic on-site verification.

According to a preferred aspect of the invention, the participant must implement (and maintain) a predefined number (group) of PEMs prior to being certified, and thereafter implement (and maintain) a predefined number of additional PEMs at specified years after certification in order to maintain certification. In the preferred embodiment, where a PEM is implemented in a facility and is applicable to multiple locations in the facility (e.g., fluorescent lamps, ice cube machines, photocopiers, etc.), in order for the PEM to be considered to be properly implemented, the PEM is required to be implemented in at least a majority, and preferably at least seventy-five percent of the locations in the facility. Also, in the preferred embodiment of the invention, the PEMs are required to be initially implemented at a single facility, and then during a specified period of time after initial certification, the PEMs are required to be implemented at a majority, and preferably seventy-five percent, of the participant's operations (where the participant has multiple facilities). Should a participant choose a PEM which does not lend itself to implementation across seventy-five percent of the participant's operations, it is preferable that the participant demonstrate that the total profitability and environmental benefit of the PEM be at least as profitable for the company and the environment as the PEM that the participant would have implemented in its place across at least seventy-five percent of the participant's operations.

Figure 3:
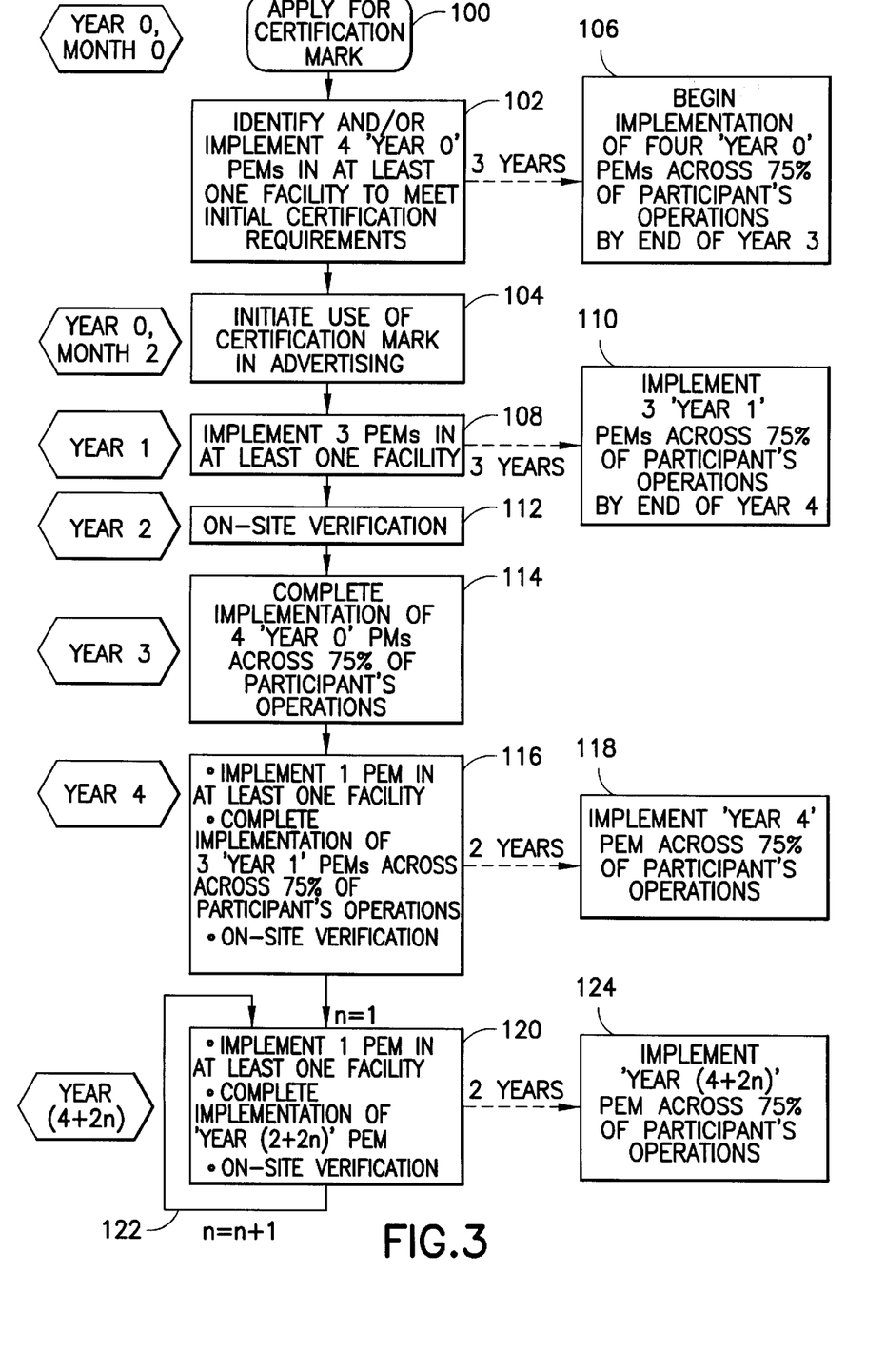
FIG. 3 is a flowchart of the criteria for being in compliance with the environmental certification program of the invention.

Turning now to FIG. 3, according to one preferred embodiment of the environmental certification program of the invention, a company applies at 100 (at 'year 0' and 0 months) to become a participant in the environmental certification program. Upon acceptance into the program, but prior to certification, the company (now a 'participant') must at 102 either (1) identify four presently implemented PEMs at at least one of its facilities, (2) implement four PEMs in at least one of its facilities, or (3) provide a combination of identification and implementation such that four PEMs are in order at at least one of its facilities. The identified/implemented PEMs (compliance data) are reported to the organizers of the environmental certification program and input into the database 12. Once the four 'year 0' (or precertification) PEMs have been implemented (or identified), the participant is approved for certification at 18, preferably within two months, and is permitted at 104 to use a predefined certification mark in conjunction with its advertising and goods. In addition, the participant should begin at 106 phasing in the four 'year 0' PEMs across its other facilities (if any), as these PEMs, according to this embodiment, must be implemented across seventy-five percent of the participant's operations by the end of 'year 3' of certification in order to maintain the certification.

During 'year 1' of certification the participant must implement at 108 three additional PEMs in one of its facilities in order to maintain the privilege of using the certification mark in conjunction with its goods and advertising. These PEMs are reported to the organizers for input into the database 12. At 110, the participant should begin phasing in the three 'year 1' PEMs across its other facilities, as these PEMs must be implemented across seventy-five percent of the participant's operations by the end of 'year 4' of certification in order to maintain the certification.

During 'year 2', the organizers of the environmental certification program undertake at 112 an on-site verification of the participant's identified and implemented 'year 0' and 'year 1' PEMs, as reported to the organizers, and as previously stored within the database 12. On-site verification is preferably required to maintain certification. Of course, if desired, verification may be required to obtain certification at step 102.

During 'year 3', the participant must complete at 114 implementation of the four 'year 0' PEMs to seventy-five percent of its operations in order to maintain certification.

During 'year 4', at 116, in order to maintain certification, the participant must implement one additional PEM in one facility, complete implementation of the three 'year 1' PEMs to seventy-five percent of its operations, and pass an on-site verification. The participant then has two additional years in which to implement at 118 the 'year 4' PEM at seventy-five percent of its operations.

During 'year 6' (denoted 'year 4+2n', where n=1), at 120, in order to maintain certification, the participant must implement one additional PEM in one facility, complete implementation of the three 'year 4' (denoted 'year 2+2n, where n=1) PEM to seventy-five percent of its operations, and pass an on-site verification. The participant then has two additional years in which to implement, at 124, the 'year 6' PEM at seventy-five percent of its operations.

During 'year 8' and every two years thereafter (collectively denoted 'year 4+2n', where n=2, 3, 4 . . . ), at 122, in order to maintain certification, the participant must implement one additional PEM in one facility, complete implementation of the one 'year 2+2n' PEM to seventy-five percent of its operations, and pass an on-site verification. The participant then at 124 has two additional years in which to implement the 'year 4+2n' PEM at seventy-five percent of its operations.

According to the preferred embodiment of the invention n has no maximum value, and the certification program requires the implementation of at least one additional PEM every two years (and maintenance of previously implemented PEMs and further implementation of 'year 2+2n', PEM) for as long as the participant is participating in the program of the invention.

However, according to a less preferred alternative embodiment, it will be appreciated that at least one additional PEM is required to be implement only until $n=n_{max}$ (i.e., a predetermined terminal number). That is, it may be desired to eliminate the requirement of implementing additional PEMs after a certain period time as the PEMs appropriate for implementation by a participant may eventually be exhausted. Therefore, according to the alternative embodiment of the invention, after 'year 4+2n', $n=n_{max}$, the participant is preferably given perpetual certification, provided that the participant continues to maintain previously implemented PEMs and remains subject to on-site verification. An exemplar $n_{max}$ is 13, thereby providing perpetual certification at 'year 30' when the participant has implemented 20 PEMs.

At the end of each year following certification, the participant reports its compliance with the program to the organizers of the program for input into the database 12, and the database evaluates the participant's compliance. If the participant has met the required goals, e.g., implementation of new PEMs, further implementation of existing PEMs, passed on-site verification, etc., then the participant's certification is renewed at 18 and the participant maintains the privilege of displaying the certification mark.

Should the participant fail to comply with any particular requirement during any particular year, the participant loses at 20 the privilege of displaying the certification mark in conjunction with its goods and advertisement. In addition, should the participant fail to voluntarily report compliance information by the required deadline, the participant is preferably considered to be in non-compliance, and loses the privilege of displaying the certification mark. However, it is preferable that a participant be given a short period of time in which to correct any inadvertent defects in its compliance. Once the participant corrects all aspects of its non-compliance, the participant is once again eligible to use the certification mark.

It will be appreciated that the data processing method for an environmental certification program provides uniform criteria for participants in the program. As such, the certification mark provided by the program to a complying participant has discernable value in the marketplace. In addition, the continued display of the certification mark by a participant on its goods and in its advertising signifies the participant's dedication to environmental concerns and the willingness of the participant to act to be a model environmental citizen.

There have been described and illustrated herein an embodiment of a system and method for an environmental certification program. While a particular embodiment of the invention has been described, it is not intended that the invention be limited thereto, as it is intended that the invention be as broad in scope as the art will allow and that the specification be read likewise. Thus, while particular categories of environmentally beneficial criteria have been disclosed, it will be understood that other categories may be used. Furthermore, while particular exemplar profitable environmental measures (PEMs) have been disclosed, it will be appreciated that other PEMs exist and may also be used. Also, while a particular preferred timetable for implementation of PEMs has been disclosed, it will be recognized that another timetable may be used. Likewise, while a particular number of PEMs are preferred to be implemented over the timetable, it will be appreciated that the certification program can require a fewer or greater number of PEMs to be implemented by any particular deadline. In addition, selection of PEMs from two or more categories may be required for certification, if desired. Moreover, on-site verification may be conducted with greater or lesser frequency. In addition, the term 'group' is used in the specification to mean a predefined number; as such, a group shall be considered as consisting of one or more. It will therefore be appreciated by those skilled in the art that yet other modifications could be made to the provided invention without deviating from its spirit and scope as so claimed.

What is claimed is:

1. A data processing method for an environmental certification program for participation in by a participant and which permits the participant, when in compliance with the program, to utilize a certification mark in association with at least one of the goods and advertising of the participant, the participant having operations including at least one facility, said data processing method comprising:

a) defining a plurality of environmentally beneficial criteria and storing said criteria in a database;

b) requiring the participant to comply with a first group of said plurality of criteria;

c) upon compliance with said first group of said plurality of criteria, recording a first compliance in the database and notifying the participant that the participant is permitted to use the certification mark;

d) requiring the participant to comply with a second group of said plurality of criteria by a predefined first date stored in said database, said second group being different than said first group;

e) upon compliance with said second group of said plurality of criteria by said first date, recording a second compliance in the database and permitting the participant to continue to use the certification mark; and f) upon failure to comply with said second group of said plurality of criteria by said first date, recording a non-compliance in the database and notifying the participant that the participant is decertified.

2. A data processing method according to claim 1, wherein:

compliance with said plurality of environmentally beneficial criteria is economically profitable to the participant.

3. A data processing method according to claim 2, wherein:

said economic profitability results from at least one of cost-savings and increased productivity.

4. A data processing method according to claim 2, wherein:

said economic profitability results from increased sales associated with the use of the certification mark.

5. A data processing method according to claim 1, wherein:

said environmentally beneficial criteria are divided into a plurality of categories, said plurality of categories including at least two of energy efficiency, use of renewable energy, recycling, waste minimization, health and safety, reduction of environmental liabilities, and corporate citizenship.

6. A data processing method according to claim 1, wherein:

said first group consists of four environmentally beneficial criteria.

7. A data processing method according to claim 1, wherein:

said first group of said plurality of criteria must be implemented in a first portion of the operations of the participant prior to certification, and must be implemented in a second portion of the operations by a third predefined date stored in said database.

8. A data processing method according to claim 7, wherein:

said first portion of the operations consists of one facility of the participant, and said second portion of the operations consists of a majority of the operations of the participant.

9. A data processing method according to claim 7, wherein:

said second group of said plurality of criteria must be implemented in a third portion of the operations of the participant by a fourth predefined date stored in said database, and must be implemented in a fourth portion of the operations greater than said third portion of the operations by a fifth predefined date stored in said database.

10. A data processing method according to claim 9, wherein:

said third portion and said first portion are the same portion.

11. A data processing method according to claim 9, wherein:

said third portion of the operations consists of one facility of the participant, and said fourth portion of the operations consists of a majority of the operations of the participant.

12. A data processing method according to claim 1, further comprising:

g) requiring the participant to comply with a third group of said plurality of criteria by a predefined third date stored in said database, said third group being different than said first group and said second group;

h) upon compliance with said third group of said plurality of criteria by said third date, recording a third compliance in the database and permitting the participant to continue to use the certification mark; and i) upon failure to comply with said third group of said plurality of criteria by said third date, recording a non-compliance in the database and notifying the participant that the participant is decertified.

13. A data processing system according to claim 12, wherein:

said predefined first date is one year after compliance with said first group of said plurality of criteria.

14. A data processing system according to claim 12, wherein:

said first group comprises at least four of said plurality of criteria, said second group comprises at least three of said plurality of criteria and said third group comprises at least one of said plurality of criteria.

15. An environmental certification system for an environmental certification program for participation in by a participant and which permits the participant, when in compliance with the program, to utilize a certification mark in association with at least one of the goods and advertising of the participant, the participant having operations including at least one facility, said environmental certification system comprising:

a) means for defining a plurality of environmentally beneficial criteria and storing said criteria in a database;

b) means for requiring the participant to comply with a first group of said plurality of criteria;

c) means for recording a first compliance in the database and notifying the participant that the participant is permitted to use the certification mark upon compliance with said first group of said plurality of criteria;

d) means for requiring the participant to comply with a second group of said plurality of criteria by a predefined first date stored in said database, said second group being different than said first group;

e) means for recording a second compliance in the database and permitting the participant to continue to use the certification mark upon compliance with said second group of said plurality of criteria by said first date; and f) means for recording a non-compliance in the database and notifying the participant that the participant is decertified upon failure to comply with said second group of said plurality of criteria by said first date.

16. An environmental certification system according to claim 15, wherein:

compliance with said plurality of environmentally beneficial criteria is economically profitable to the participant.

17. An environmental certification system according to claim 15, wherein:

said environmentally beneficial criteria are divided into a plurality of categories, including at least two of energy efficiency, use of renewable energy, recycling, waste minimization, health and safety, reduction of environmental liabilities, and corporate citizenship.

18. An environmental certification system according to claim 15, wherein:

said first group of said plurality of criteria must be implemented in a first portion of the operations of the participant prior to certification, and must be implemented in a second portion of the operations by a third predefined date stored in said database.

19. An environmental certification system according to claim 18, wherein:

said first portion of the operations comprises at least one facility of the participant, and said second portion of the operations comprises a majority of the operations of the participant.

20. An environmental certification system according to claim 18, wherein:

said second group of said plurality of criteria must be implemented in a third portion of the operations of the participant by a fourth predefined date stored in said database, and must be implemented in a fourth portion of the operations greater than said third portion of the operations by a fifth predefined date stored in said database.

21. An environmental certification system according to claim 20, wherein:

said third portion of the operations comprises at least one facility of the participant, and said fourth portion of the operations comprises a majority of the operations of the participant.

22. An environmental certification system according to claim 15, further comprising:

g) means for requiring the participant to comply with a third group of said plurality of criteria by a predefined third date stored in said database, said third group being different than said first group and said second group;

h) means for recording a third compliance in the database and permitting the participant to continue to use the certification mark upon compliance with said third group of said plurality of criteria by said third date; and i) means for recording a non-compliance in the database and decertifying the participant upon failure to comply with said third group of said plurality of criteria by said third date.

23. An environmental certification system according to claim 22, wherein:

said predefined first date is one year after compliance with said first group of said plurality of criteria.

24. An environmental certification system according to claim 22, wherein:

said first group comprises at least four of said plurality of criteria, said second group comprises at least three of said plurality of criteria, and said third group comprises at least one of said plurality of criteria.

* * * * *